United States Patent
Feldheim et al.

(10) Patent No.: US 6,602,932 B2
(45) Date of Patent: Aug. 5, 2003

(54) NANOPARTICLE COMPOSITES AND NANOCAPSULES FOR GUEST ENCAPSULATION AND METHODS FOR SYNTHESIZING SAME

(75) Inventors: Daniel L. Feldheim, Cary, NC (US); Stella M. Marinakos, Raleigh, NC (US); David A. Shultz, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 14 days.

(21) Appl. No.: 09/738,060

(22) Filed: Dec. 15, 2000

(65) Prior Publication Data

US 2002/0115747 A1 Aug. 22, 2002

Related U.S. Application Data

(60) Provisional application No. 60/171,013, filed on Dec. 15, 1999.

(51) Int. Cl.[7] .................................................. C08K 9/00
(52) U.S. Cl. ...................... 523/201; 523/205; 523/210; 523/216; 523/217
(58) Field of Search ................................ 523/201, 205, 523/210, 216, 217

(56) References Cited

U.S. PATENT DOCUMENTS

| 5,219,577 A | 6/1993 | Kossovsky et al. |
| 5,462,751 A | 10/1995 | Kossovsky et al. |
| 6,159,620 A | 12/2000 | Heath et al. |
| 6,322,890 B1 * | 11/2001 | Barron et al. ................ 428/402 |

OTHER PUBLICATIONS

Donath et al., "Novel Hollow Polymer Shells by Colloid–Templated Assembly of Polyelectrolytes," Angew. Chem. Int. Ed., vol. 37 (No. 16), p. 2202–2205, (1998).

Caruso et al., "Nanoengineering of Inorganic and Hybrid Hollow Spheres by Colloidal Templating," Science, vol. 282 (No. 6), p. 1111–1114, (1998).

Marinakos et al., "Gold Nanoparticles as Templates for the Synthesis of Hollow Nanometer–Sized Conductive Polymer Capsules," Adv. Mater., vol. 11 (No. 1), p. 34–37, (1999).

Marinakos et al., "Gold Particles as Templates for the Synthesis of Hollow Polymer Capsules. Control of Capsule Dimensions and Guest Encapsulation," J. Am. Chem. Soc., vol. 121 (No. 37), p. 8518–8522, (1999).

Marinakos et al., "Template Synthesis of One–Dimentional Au, Au–Poly(pyrrole), and Poly(pyrrole) Nanoparticle Arrays," Chem. Mater., vol. 10, p. 1214–1219, (1998).

* cited by examiner

Primary Examiner—Edward J. Cain
(74) Attorney, Agent, or Firm—Jenkins, Wilson & Taylor, P.A.

(57) ABSTRACT

Nanoparticle composites and nanocapsules for guest encapsulation and methods for synthesizing same. One synthesis method includes providing a nanoparticle template; and forming a shell on the nanoparticle template by polymerizing a monomer on the nanoparticle template to form a nanoparticle composite defined by the shell and the nanoparticle template. Another synthesis method includes providing a nanoparticle template; forming a shell on the nanoparticle template by polymerizing a monomer on the nanoparticle template; and dissolving the nanoparticle template to thereby form a hollow nanocapsule defined by the shell. Another synthesis method includes providing a nanoparticle template carrying a guest molecule; and forming a shell on the nanoparticle template by polymerizing a monomer on the nanoparticle template to thereby encapsulate the guest molecule. This method can also include dissolving the nanoparticle template to form a nanocapsule defined by the capsule shell material, wherein the guest material resides in the nanocapsule.

21 Claims, 15 Drawing Sheets

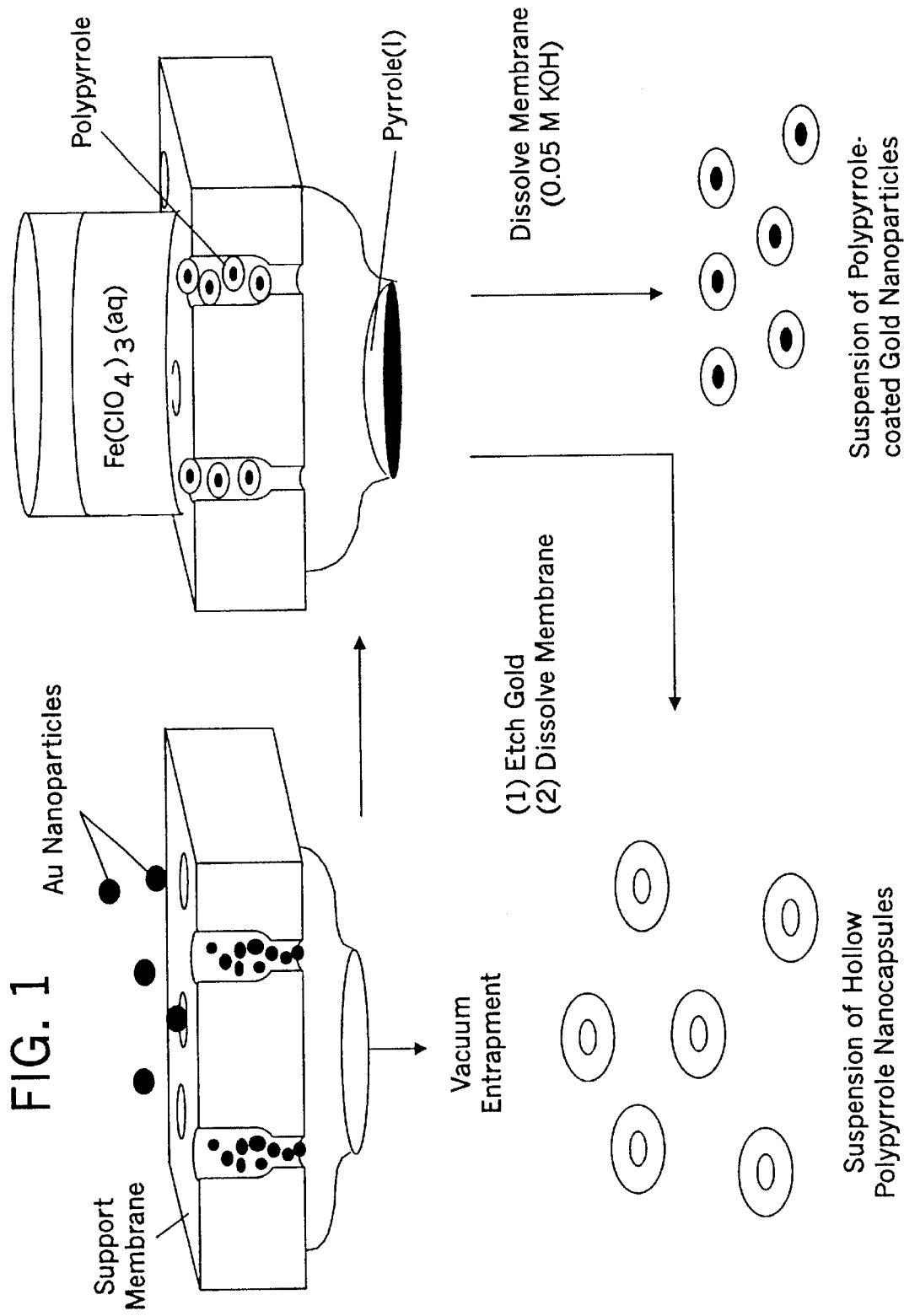

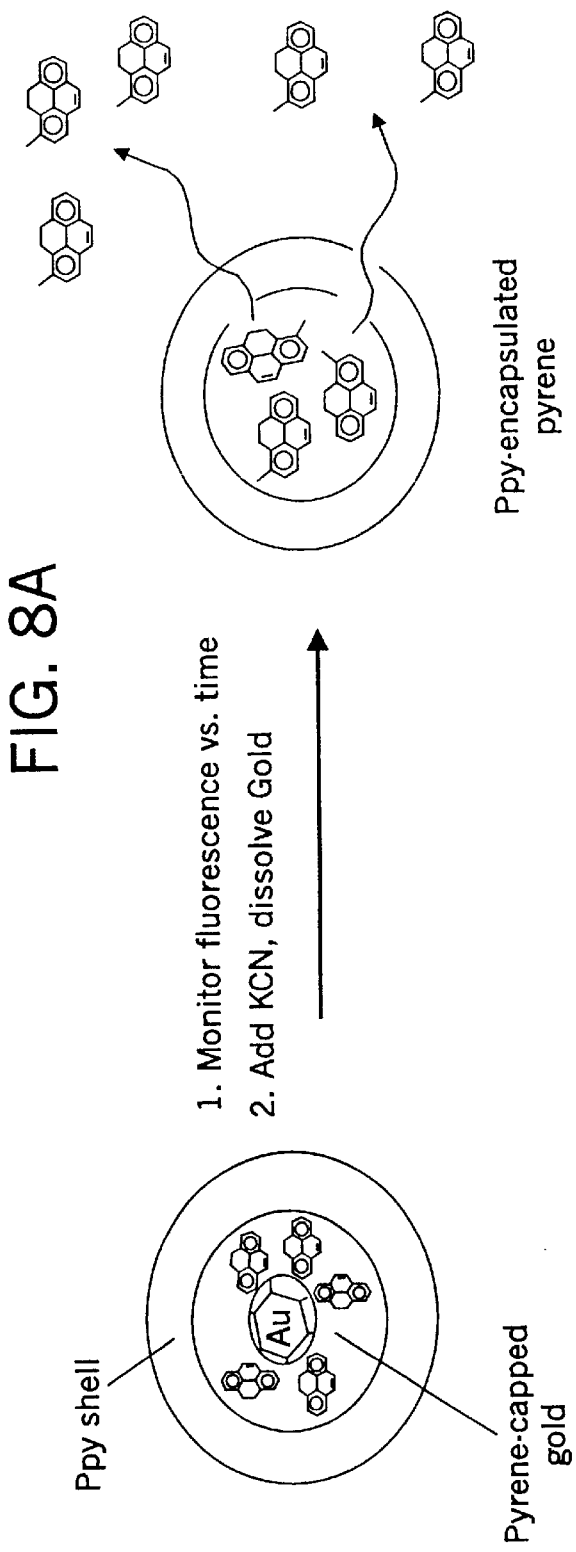
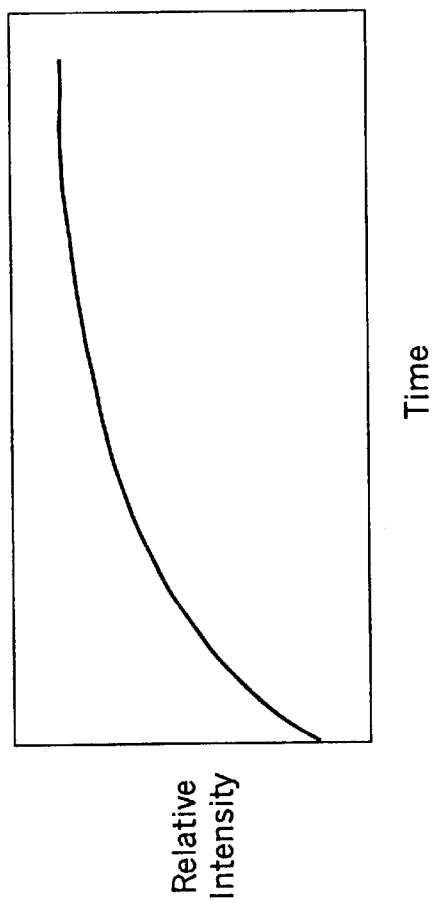
FIG. 8A
FIG. 8B

NANOPARTICLE COMPOSITES AND NANOCAPSULES FOR GUEST ENCAPSULATION AND METHODS FOR SYNTHESIZING SAME

CROSS REFERENCE TO RELATED APPLICATIONS

This application is based on and claims priority to U.S. provisional patent application Ser. No. 60/171,013, filed Dec. 15, 1999, herein incorporated by reference in its entirety.

TECHNICAL FIELD

The present invention pertains generally to novel nanoparticles and to methods for synthesizing the same. More particularly, the present invention pertains to novel nanoparticle composites and novel hollow nanometer-sized capsules, each preferably for use in guest encapsulation applications, and methods for synthesizing same.

BACKGROUND ART

The list of potential applications for nanostructured composites and hollow polymeric nanocapsules is long. Drug delivery (Langer, R. *Science* (1990) 249:1527; Peppas, N. A. and Langer, R. *Science* (1994) 263:1715; Langer, R. *Acc. Chem. Res.* (1993) 26:537); cell and enzyme transplantation (Pathak, C. P., et al. *J. Am. Chem. Soc.* (1992) 114:8311; Gill, I. and Ballesteros, A. *J. Am. Chem. Soc.* (1998) 120:8587), contaminated waste removal (*Chem. Eng. News* (1999) 77:32), gene therapy (Kmiec, E. B., *Am. Sci.* (1999) 87:240) and heterogeneous catalysis (Morris, C. A. et al., *Science* (1999) 284:622) comprise representative applications.

In response to the growing need for encapsulation materials, several different routes to hollow ceramic and polymeric capsules have been attempted. For example, dendrimers (Zhao, M., et al. *J. Am. Chem. Soc.* (1998) 120:4877), block copolymers (Thurmond, K. B., II, et al. *J. Am. Chem. Soc.* (1997) 119:6656; Macknight, W. J., et al., *Acc. Chem. Res.* (1998) 31:781; Harada, A. and Kataoka, K. *Science* (1999), 283:65), vesicles (Hotz, J. and Meier, W. *Langmuir* (1998) 14:1031; Discher, B. M., et al., *Science* (1999) 284:1143), hydrogels (Kataoka, K. et al. *J. Am. Chem. Soc.* (1998) 120:12694) and template-synthesized microtubules (Martin, C. R. and Parthasarathy, R. V. *Adv. Mater.* (1995) 7:487) have been proposed for use as encapsulants for catalytic metal clusters, small molecules, or enzymes.

Other recent efforts to provide methods for the synthesis of hollow capsules have attempted to employ nanometer- and micrometer-sized particles as a template from which to grow the capsule shell. See e.g. Giersig, M. et al. *Adv. Mater.* (1997) 9:575; Caruso, F. et al. *Science* (1998) 282:1111. However, these attempts are substantially limited by time-consuming sequential polyelectric deposition cycles.

Despite the disclosure of the foregoing methods, no currently available synthetic nanoparticles have been adapted to meet desirable requirements for delivery/encapsulation materials. These criteria include, in part:

(1) Mild synthetic conditions so as not to destroy the normal function of a bioactive species (e.g., cell, drug or enzyme) to be encapsulated;

(2) Stability under physiological or environmental conditions for extended periods (up to several years for biological use);

(3) Selective size and permeability to allow passage of small molecule substrates or drugs while precluding passage of large or immunoglobulins or other fouling agents;

(4) Small size (<100 nm) and narrow size dispersity; and (5) The ability to localize biomolecules in the capsule interior.

Thus, there is a long-felt and continuing need in the art for a novel nanoparticle composite or nanocapsule, and synthesis methods for the same, that address the requirements stated above. Such nanoparticle composites and nanocapsules, and synthesis methods for same, are not currently available in the art.

SUMMARY OF THE INVENTION

A method for synthesizing nanoparticle composites is provided. The method comprises providing a nanoparticle template; and forming a shell on the nanoparticle template by polymerizing a monomer on the nanoparticle template to form a nanoparticle composite defined by the shell and the nanoparticle template.

A method for synthesizing hollow nanoscopic capsules is also provided. The method comprises providing a nanoparticle template; forming a shell on the nanoparticle template by polymerizing a monomer on the nanoparticle template; and dissolving the nanoparticle template to form a hollow nanocapsule defined by the shell.

A method for encapsulating a guest molecule in a nanoparticle is also disclosed. The method comprises providing a nanoparticle template conjugated to a guest molecule; and forming a shell on the nanoparticle template by polymerizing a monomer on the nanoparticle template to thereby encapsulate the guest molecule. In a more preferred embodiment, the method further comprises dissolving the nanoparticle template to form a nanocapsule defined by the capsule shell material, wherein the guest material resides in the nanocapsule.

Novel nanoparticle composites and novel hollow nanometer-sized capsules are also disclosed. In a preferred embodiment, the nanoparticle composites and nanometer-sized capsules further comprise a guest molecule. In a more preferred embodiment, the nanoparticle composites and nanometer-sized capsules are synthesized by the methods of the present invention.

Accordingly, it is an object of the present invention to provide novel nanoparticle composites, multilayered nanoparticle composites and hollow nanocapsules, and methods for synthesizing the same. The object is achieved in whole or in part by the present invention.

An object of the invention having been stated hereinabove, other objects will become evident as the description proceeds when taken in connection with the accompanying Drawings and Examples as best described hereinbelow.

BRIEF DESCRIPTION OF THE DRAWINGS

FIG. 1 is a schematic flow diagram of a preferred embodiment of a synthesis process of the present invention.

Figures 2A, 2B, 2C:
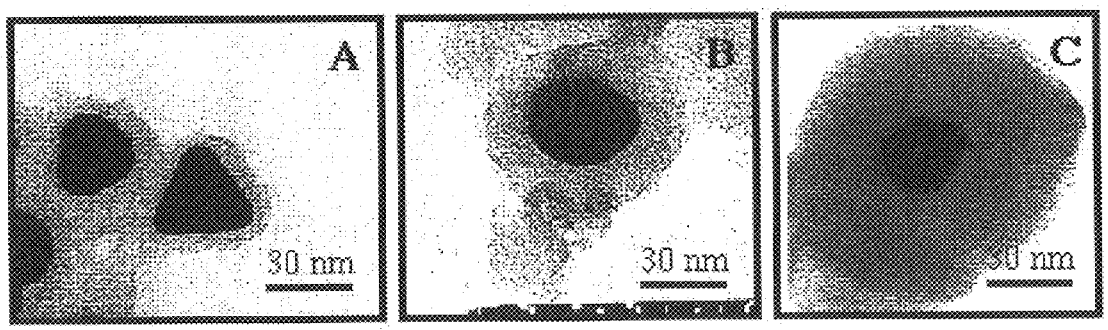
FIG. 2A is a transmission electron micrograph of poly (pyrrole) shell thickness vs polymerization time at time=5 min, and depicts the control over the thickness of a polymer shell layer on a nanoparticle template provided by the process of the present invention. The measurement bar in the transmission electron micrograph is 30 nanometers (nm).
FIG. 2B is a transmission electron micrograph of poly (pyrrole) shell thickness vs polymerization time at time=20 min, and depicts the control over the thickness of a polymer shell layer on a nanoparticle template provided by the process of the present invention. The measurement bar in the transmission electron micrograph is 30 nanometers (nm).

FIG. 2C is a transmission electron micrograph of poly (pyrrole) shell thickness vs polymerization time at time=45 min, and depicts the control over the thickness of a polymer shell layer on a nanoparticle template provided by the process of the present invention. The measurement bar in the transmission electron micrograph is 30 nanometers (nm).

Figure 2D:
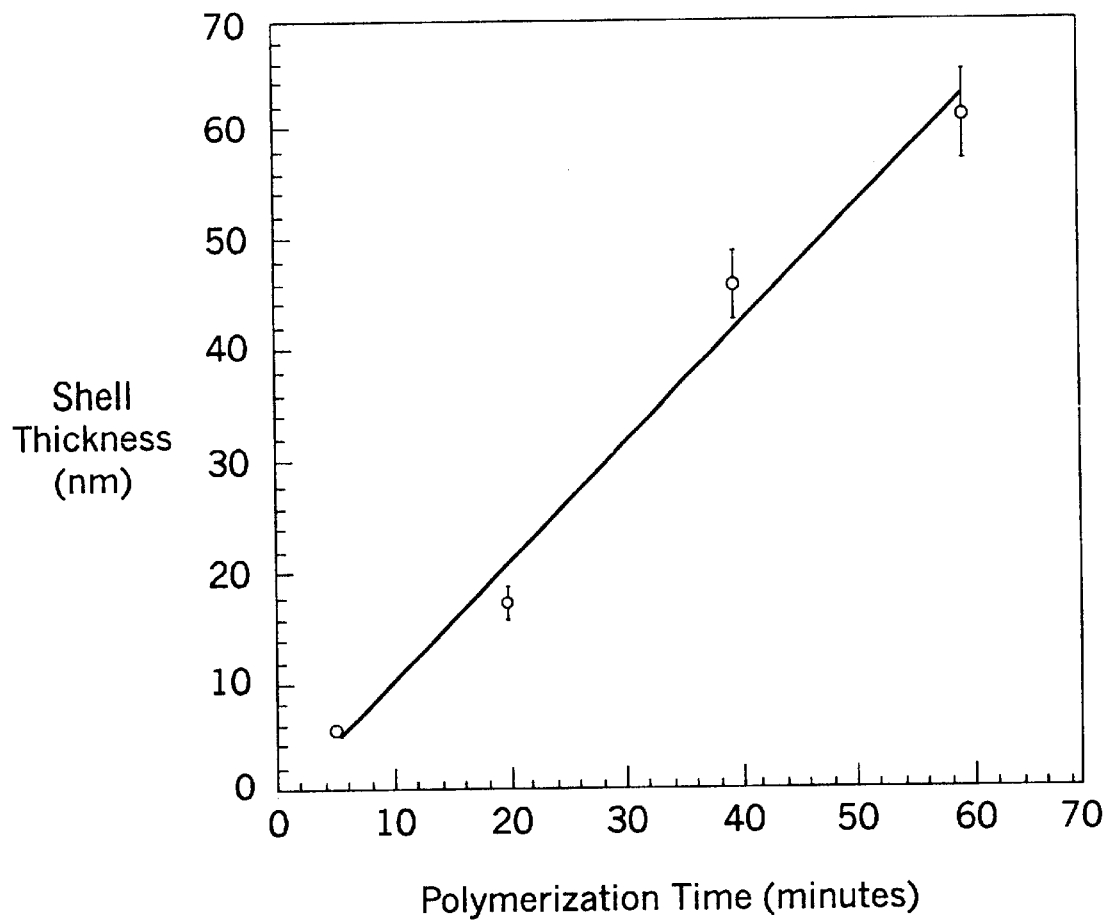

FIG. 2D is a line graph of the microscopy data presented in FIGS. 2A through 2C.

Figure 3A:
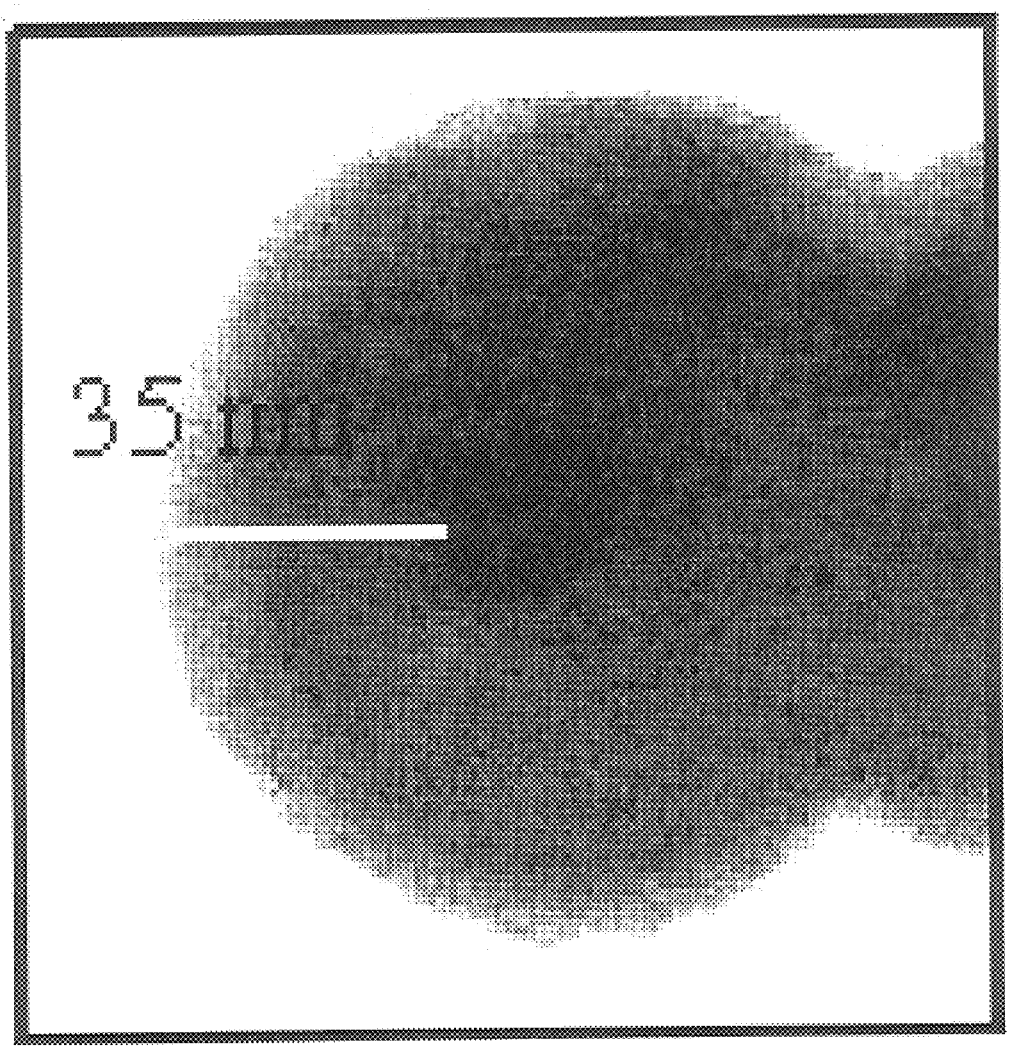

FIG. 3A is a transmission electron micrograph of a nanoparticle composite formed via 15 min poly(pyrrole) deposition onto a gold nanoparticle template.

Figure 3B:
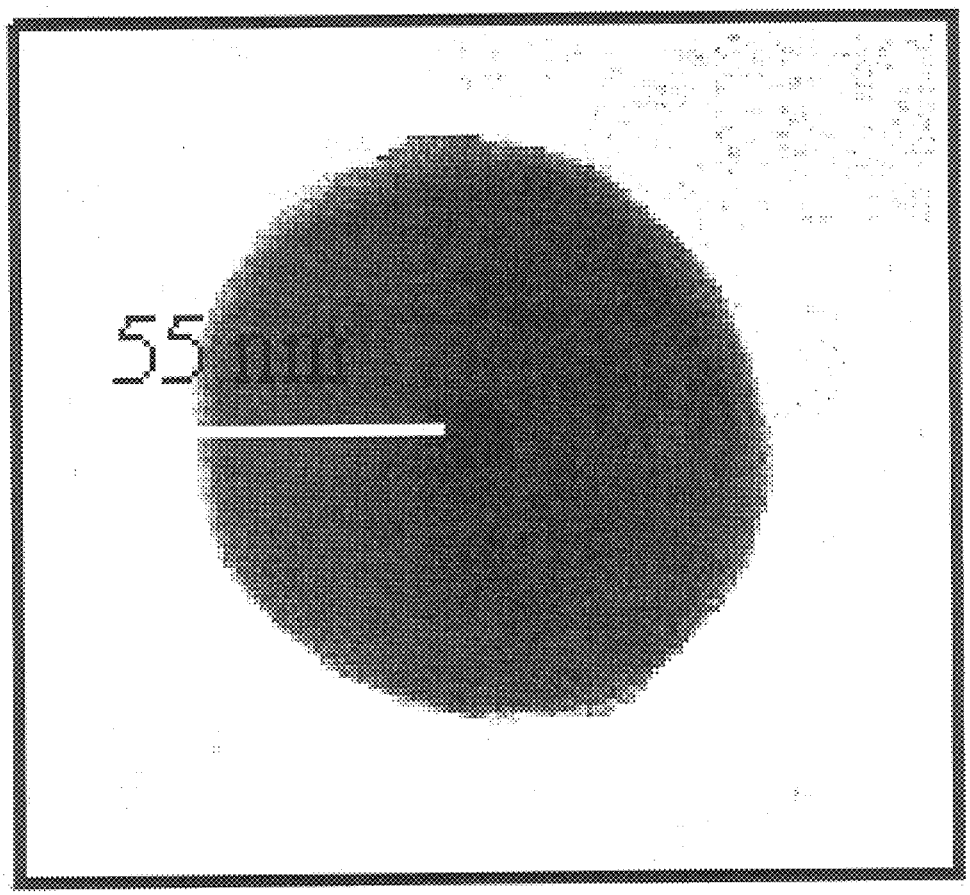

FIG. 3B is a transmission electron micrograph of a poly(N-methylpyrrole)/poly(pyrrole)/gold nanoparticle composite formed by sequentially depositing poly(pyrrole) for 10 min and poly(N-methylpyrrole) for 5 min onto a gold nanoparticle template. The magnification is not identical to the magnification of FIG. 3A.

Figure 4A:
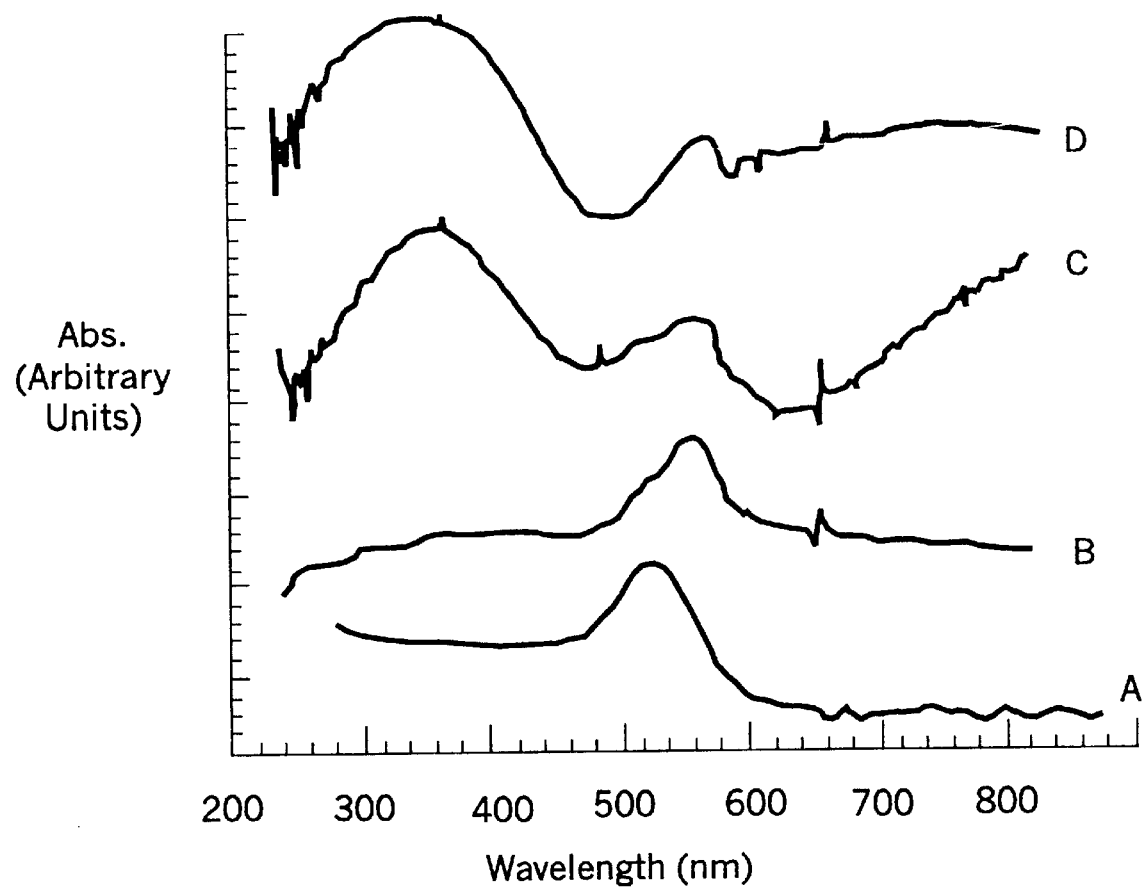

FIG. 4A is a graph depicting ultraviolet (UV)-visible spectra for 30 nm diameter gold particles (line A), rhodamine B capped gold particles (line B), poly(N-methylpyrrole)-encapsulated rhodamine B capped gold nanoparticles (line C), and poly-(N-methylpyrrole)-encapsulated rhodamine B capped gold nanoparticles following exposure to gold etch solution (line D).

Figure 4B:
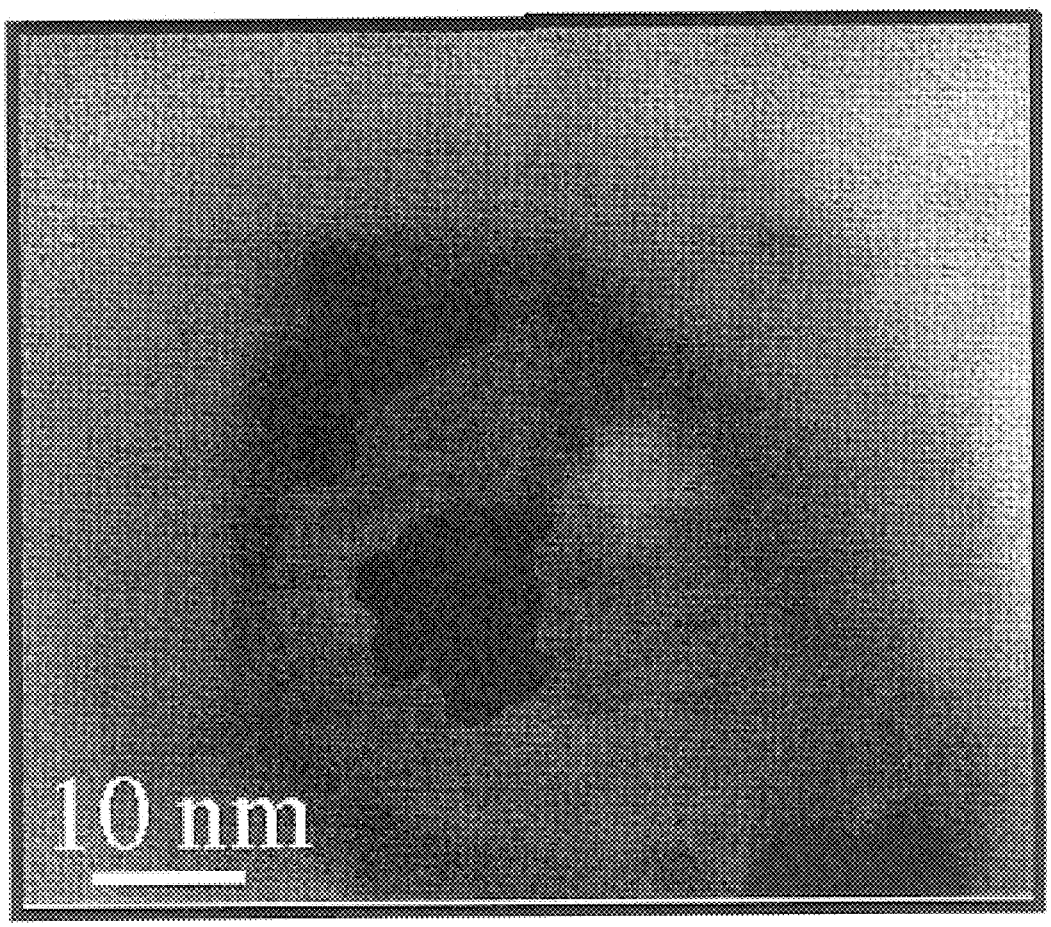

FIG. 4B is a transmission electron micrograph of poly(N-methylpyrrole)-encapsulated rhodamine B. The capsules were stained with aqueous CsOH to render the rhodamine B visible by electron microscopy in accordance with techniques described by Ding, J. and Liu, G., *J. Phys. Chem.* (1998) 102:6107.

Figure 5A:
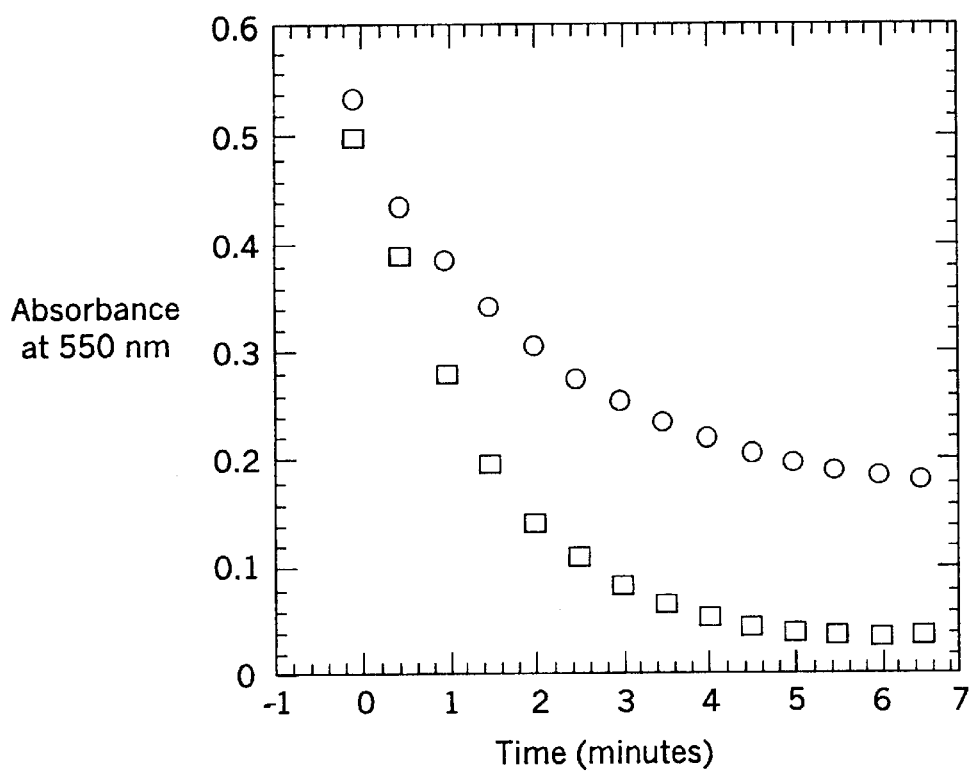

FIG. 5A is a graph depicting diffusion data for gold etchant after treatment of a gold nanoparticle template coated with poly(N-methylpyrrole)-$ClO_4$ and poly(N-methylpyrrole) with an etch solution and showing a plot of absorbance of the gold nanoparticle template versus etch time for poly(N-methylpyrrole)-$ClO_4$ (○) and poly(N-methylpyrrole) (□).

Figure 5B:
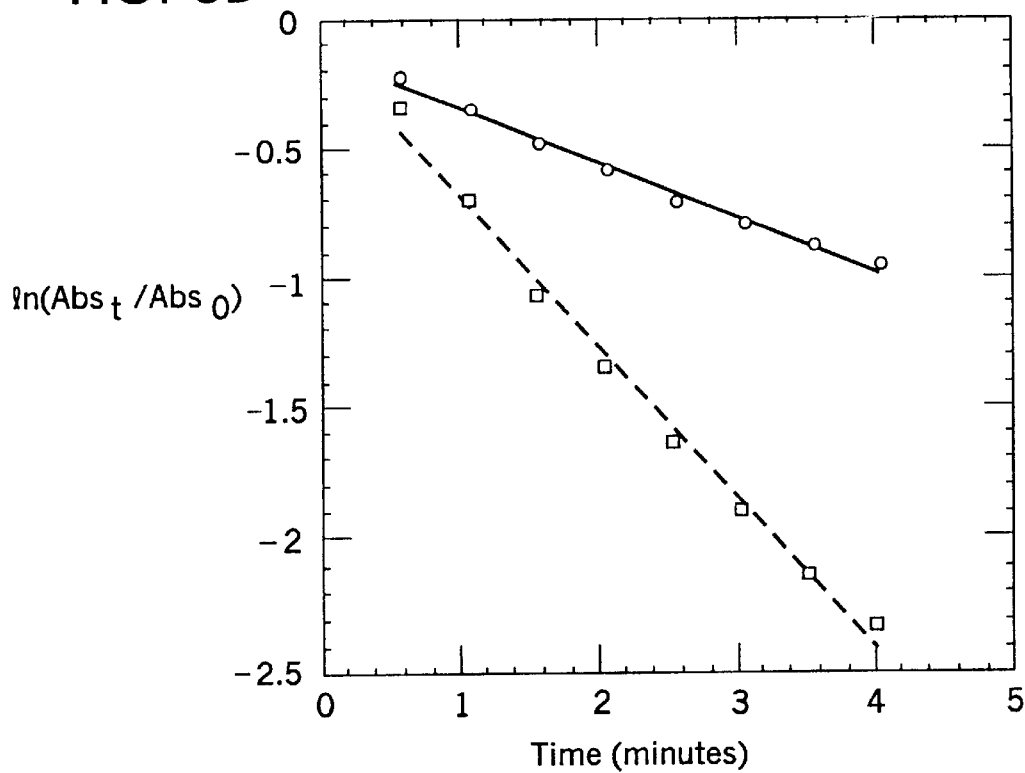

FIG. 5B is a graph of the fit of the etch data in FIG. 5A to diffusion in a spherical polymer: (○) poly(N-methylpyrrole)-$ClO_4$; (□) poly(N-methylpyrrole)(Diffusion coefficients of $5.0 \times 10^{-12}$ and $1.5 \times 10^{-11}$ $cm^2/s$, respectively, were calculated from the slopes).

Figure 6:
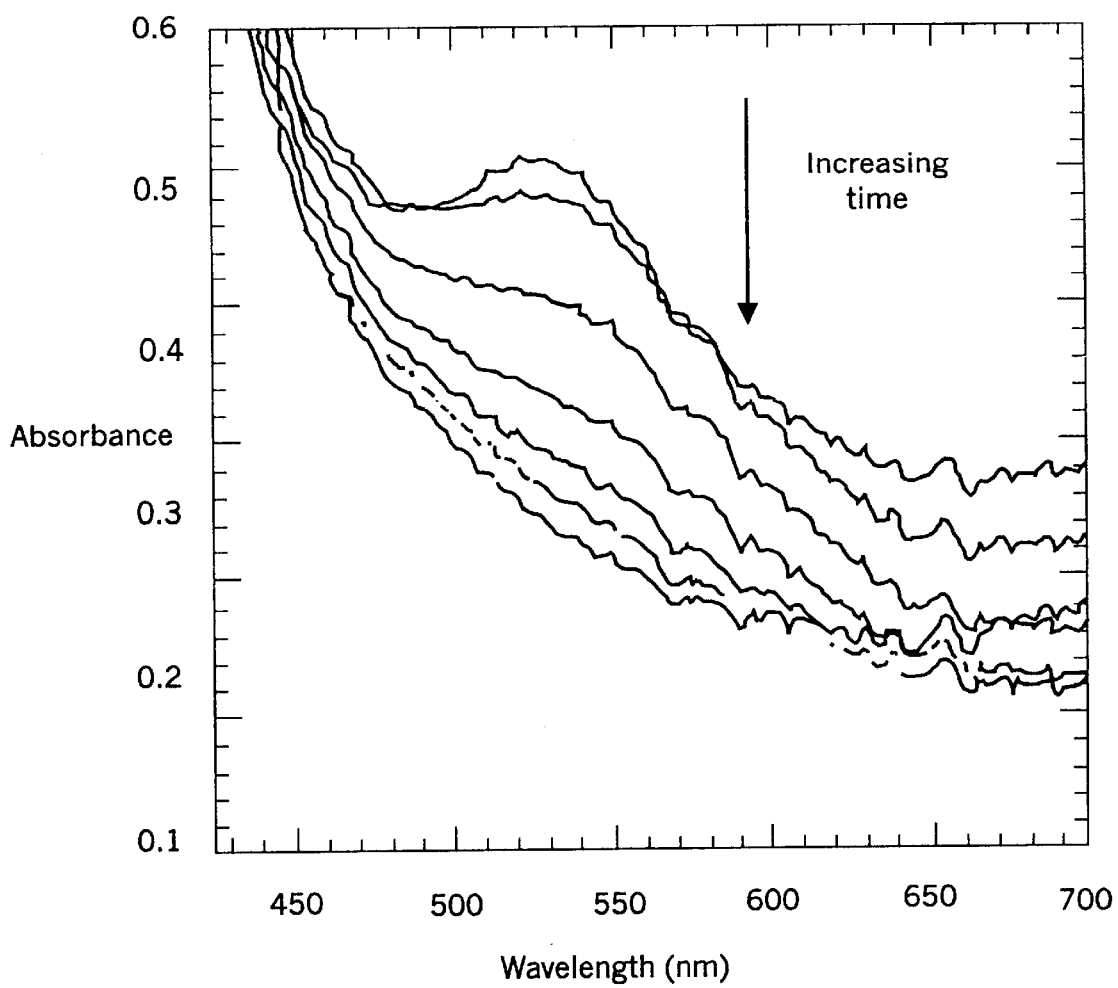

FIG. 6 is a graph depicting the visible spectra of poly(N-methylpyrrole)-coated gold nanoclusters over time following the addition of $K_3[Fe(CN)_6]$/KCN. The x-axis refers to wavelength in nanometers (nm) and the y-axis refers to absorbance.

Figure 7A:
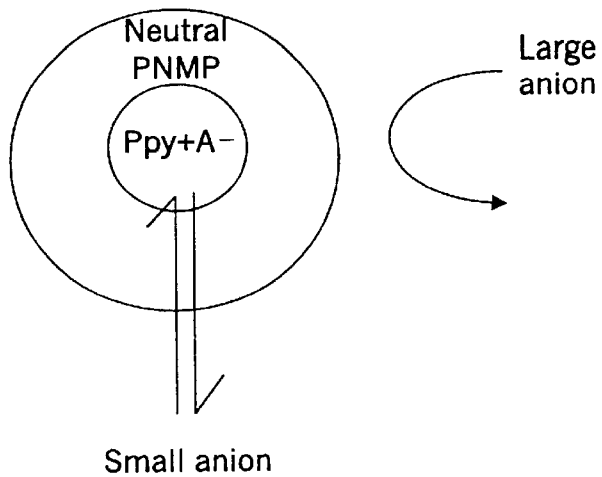

FIG. 7A depicts a poly(N-methylpyrrole)/polypyrrole multilayer nanocapsule of the present invention wherein agent A- is released in the presence of small anions.

Figure 7B:
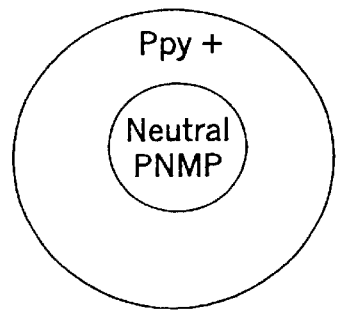

FIG. 7B depicts a poly(N-methylpyrrole)/polypyrrole multilayer nanocapsule of the present invention having a hydrophobic poly(N-methylpyrrole) core and a hydrophilic polypyrrole shell to provide a conductive polymer "micelle".

Figure 7C:
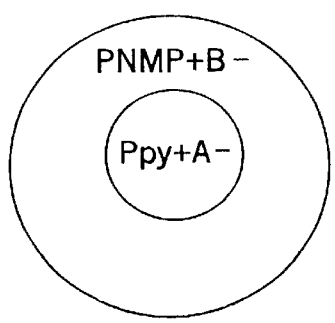

FIG. 7C depicts a poly(N-methylpyrrole)/polypyrrole multilayer nanocapsule of the present invention wherein agents A- and B- are loaded in a single release capsule.

Figure 7D:
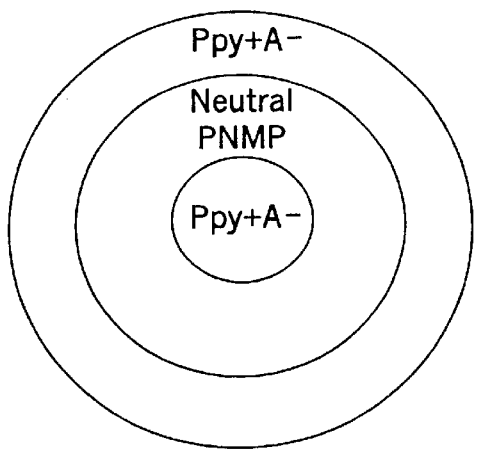

FIG. 7D depicts a poly(N-methylpyrrole)/polypyrrole multilayer nanocapsule of the present invention wherein agent A- is released at rates R1 and R2.

FIG. 8A depicts a reaction schematic for use in evaluating small molecule release rates in representative polypyrrole nanocapsules of the present invention.

FIG. 8B depicts a graphical schematic for use in evaluating small molecule release rates in representative polypyrrole nanocapsules of the present invention.

Figure 9A:
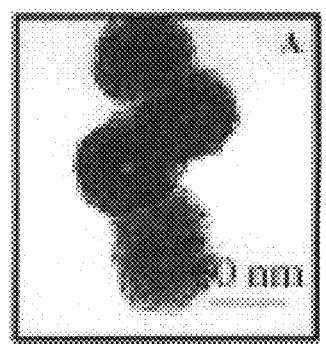

FIG. 9A is a transmission electron micrograph of hollow poly(pyrrole) capsules formed with 5 nm diameter gold template particles.

Figure 9B:

FIG. 9B is a transmission electron micrograph of hollow poly(pyrrole) capsules formed with 30 nm diameter gold template particles.

Figure 9C:

FIG. 9C is a transmission electron micrograph of hollow poly(pyrrole) capsules formed with 200 nm diameter gold template particles.

Figures 10A, 10B:
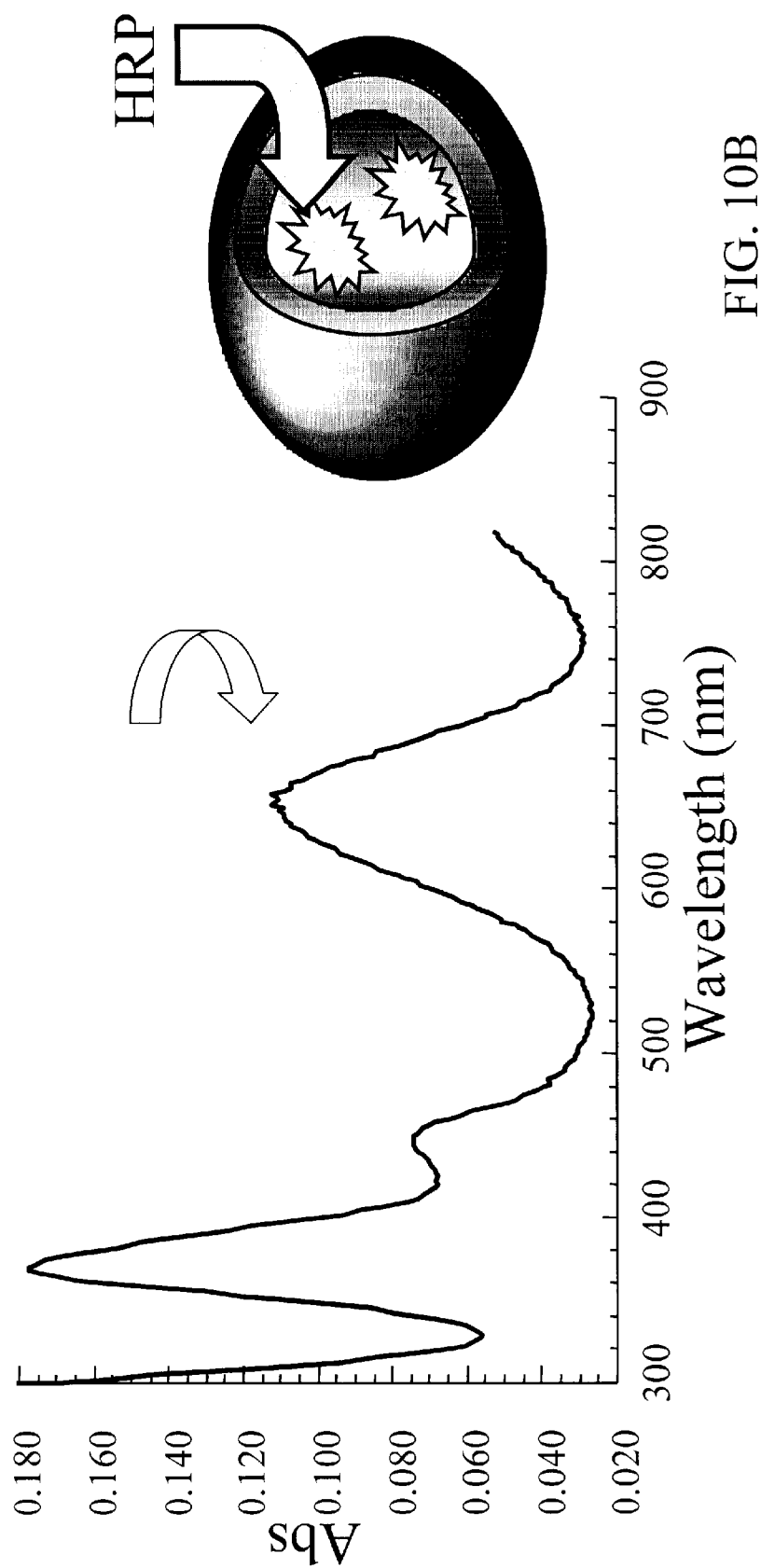

FIG. 10A is a plot of absorbance vs. wavelength showing that horseradish peroxidase remains active inside a poly (pyrrole) capsule.

FIG. 10B is a schematic representation of a poly(pyrrole) capsule having active horseradish peroxidase therein.

DETAILED DESCRIPTION OF THE INVENTION

Disclosed herein are novel methods for synthesizing nanoscopic particles including nanoscopic particle composites, and further including nanoscopic organic polymer-metal particle composites. Characterization of molecular sorption and release properties of the nanoscopic particles of the present invention is also disclosed. The utility of nanoscopic composites is clear in that such materials display previously unobserved chemical and physical properties. From an applied perspective, nanoscopic composite materials promise tremendous advances in nanoscale electronics, optics, environmental waste removal, and biotechnology.

The present invention thus pertains to methods for synthesizing nanoparticle composites, multilayered nanoparticle composites, and hollow nanocapsules. While the methods of the present invention are believed to be generally applicable in a wide variety of areas, the synthesis of spatially well-defined nanostructured materials and hollow nanocapsules along with the establishment of basic structure-function relationships have particular applicability in the areas of drug delivery, gene therapy, and enzyme and cell encapsulation.

In accordance with the present invention, a variety of nanometer-sized composite particles and hollow polymer capsules have been synthesized. The nanoparticles of the present invention embody many of the characteristics desired of encapsulation and release materials. They also provide unique opportunities for studying the behavior of molecules in spatially confined geometries. Thus, the synthesis methods of the present invention and the compositions of matter synthesized via the methods of the present invention provide a variety of advantageous nanostructural property-chemical function relationships.

As used herein and in the claims, the terms "nano", "nanoscopic", "nanometer-sized", "nanostructured", "nanoscale" and grammatical derivatives thereof are used synonymously and in some cases interchangeably to refer to nanoparticles, nanoparticle composites and hollow nanocapsules less than about 1000 nanometers (nm) in diameter, preferably less than about 200 nanometers in diameter and more preferably less than about 50 nanometers in diameter. An aspect of the present invention thus pertains to particle size in that it has been shown that liposome drug delivery systems with diameters between 50 nm and 100 nm are transported into tumor cells selectively. Freakes, D. A. et al., *Proc. Natl. Acad. Sci. USA,* (1995) 92:1367. Therefore, the present inventive methods for synthesizing nanoparticle and nanocapsule delivery systems of this size are useful to gene therapy and other medicinal applications based at the cellular level.

I. SYNTHESIS METHODS

In accordance with one embodiment of the present invention, a method for synthesizing nanoparticle composites is provided. The method comprises providing a nanoparticle template; and forming a shell on the nanoparticle template by polymerizing a monomer on the nanoparticle template to form a nanoparticle composite defined by the shell and the nanoparticle template. The capsule shell material can comprise a polymer, and thus, in a preferred embodiment, the method employs nanoparticles as templates for shell formation from a monomer via a single step polymer nucleation and growth reaction.

In accordance with another embodiment of the present invention, a method for synthesizing hollow nanoscopic capsules is also provided. The method comprises providing a nanoparticle template; forming a shell on the nanoparticle template by polymerizing a monomer on the nanoparticle template; and dissolving the nanoparticle template to form a hollow nanocapsule defined by the shell. The capsule shell material can comprise a polymer. Thus, in a preferred embodiment, the method employs nanoparticles as templates for shell formation with a monomer via a single step polymer nucleation and growth reaction. Dissolution of the template leaves a structurally intact hollow polymer capsule with a shell thickness (e.g. about 5 to >100 nm) governed by polymerization time and a hollow core diameter dictated by the diameter of the template particle (about e.g. about 5 to about 200 nm).

In accordance with the present invention, a method for encapsulating a guest molecule in a nanoparticle is also disclosed. The method comprises providing a nanoparticle template carrying a guest molecule; and forming a shell on the nanoparticle template by polymerizing a monomer on the nanoparticle template to thereby encapsulate the guest molecule. In a more preferred embodiment, the method further comprises dissolving the nanoparticle template to form a nanocapsule defined by the capsule shell material, wherein the guest material resides in the nanocapsule. The capsule shell material can comprise a polymer. Thus, in a preferred embodiment, the method employs nanoparticles as templates for shell formation with a monomer via a single step polymer nucleation and growth reaction.

The nanoparticle template can be made from any suitable material, such as a wide variety of inorganic materials including metals or ceramics. Representative metals include chromium, iron, zinc, nickel, gold, silver and platinum. Representative ceramic materials include silicon dioxide, aluminum oxide, ruthenium oxide and tin oxide.

Nanoparticle templates comprising tin oxide, silicon dioxide, iron$^{III}$ oxide ($Fe_2O_3$), silver, nickel or gold are preferred. Particles made from the above materials having diameters less than 1,000 nanometers are available commercially or they may be produced using $HAuCl_4$ and a citrate-reducing agent as described by Marinakos, S. M. et al., *Adv. Mater.* 11:34 (1999); Marinakos, S. M. et al. *Chem. Mater.* 10:1214 (1998), or using various physical and chemical vapor deposition processes, such as sputter deposition. See e.g. Hayashi, C., *J. Vac. Sci. Technol.* A5 (4), July/August 1987, pgs. 1375–1384; Hayashi, C., *Physics Today,* December 1987, pgs. 44–60; *MRS Bulletin,* January 1990, pgs. 16–47). Tin oxide having a dispersed (in $H_2O$) aggregate particle size of about 140 nanometers is available commercially from Vacuum Metallurgical Co., Ltd. of Chiba, Japan. Other commercially available particles having the desired composition and size range are available from Vector Laboratories, Inc. of Burlingame, Calif.

The capsule shell material can comprise any suitable monomer material, including but not limited to organic monomers and ceramics. Representative organic monomers include but are not limited to pyrrole, N-methylpyrrole, ethyleneglycol, styrene, nylon, nitrocellulose, 2,2'-bipyridine, $Ru^{III}$-2,2'-bipyridine$^{3+}$, and 4,4-polyether-substituted 2,2'-bipyridine. Hollow nanoscopic capsules with ceramic or poly(ethyleneglycol) shells are also contemplated because these are known biocompatible materials. Thus, the methods of the present invention for synthesizing hollow polymer capsules can be extended easily to multiple classes of polymers, ceramics and multilayer polymer—ceramic ($SiO_2$) composites. An aspect of the present invention thus pertains to "tunable" transport rates and sorption amounts via the sequence of multilayers, polymer oxidation state, polymer thickness, polymer counter-ion interactions and hollow core volume. Thus, in a preferred embodiment, the polymers are conductive; however, the polymers can also be insulative. Accordingly, polymers can also be chosen after consideration of these factors.

Membrane-Supported Synthesis of Hollow Nanocapsules

Membrane-supported methods for synthesizing polymer-gold particle composites are shown schematically in the flow diagram of FIG. 1. In a preferred embodiment of the present invention, gold nanoparticles (diameters from 5 to 200 nm) are first filtered into a porous $Al_2O_3$ support membrane (e.g., 200 nm diameter pore size). While $Al_2O_3$ is a preferred component of the support membrane, the solid support membrane can comprise any suitable material as would be apparent to one of ordinary skill in the art after review of the disclosure of the present invention herein. For example, the support membrane can comprise porous polycarbonate, porous mica, porous silica or any combination thereof.

The solid support is then clamped in a glass tube, and 0.1 M $Fe(ClO_4)_3$(aq) polymerization initiator, or other suitable polymerization initiator, is poured directly on top of the membrane. Several drops of neat monomer (e.g., pyrrole, N-methylpyrrole) are placed underneath the membrane. Monomer vapor diffuses into the membrane, where it contacts initiator to form polymer. Polymeric material deposits preferentially on the surface of gold particles to form hybrid gold core-polymer shell composites.

Spherical poly(pyrrole) nanoparticles form in the membrane support in the absence of gold particles. But, in accordance with a preferred embodiment of the present invention as described below, with a relatively high loading of gold particles in the membrane (as determined qualitatively by the volume of particle suspension filtered through the membrane and by transmission electron microscopy) very few polymer particles are found which do not contain a gold particle.

The first monomer can be replaced in the cell with a second monomer (e.g., poly(N-methylpyrrole)) to grow multilayer composites. Alternatively, an aqueous solution containing NaBH4 can be filtered through the membrane to reduce the polymer. Alternatively, a gold etch solution comprising 0.1 M KCN/0.001 M $K_3$-[Fe(CN)$_6$] can be filtered through the membrane to remove the gold particle as described below. In addition, the $Al_2O_3$ membrane may be dissolved with a suitable solvent, such as 0.05 M KOH(aq), at any time during these procedures to collect a suspension of composite particles or hollow polymer nanocapsules.

The membrane-supported synthetic method is preferred in that it is extremely quick and easy to remove growing polymer-gold composites from the monomer vapor. This allows precise control over the thickness of the polymer skin. FIG. 2A shows that, at short polymerization times (5 min), uniform polymer shells about 5 nm thick can be grown over 30 nm diameter gold template particles. Larger thicknesses are observed at longer polymerization times (20 min and 45 min in FIGS. 2B and 2C, respectively). The thickness measured for each of 20 particles from FIG. 2C was found to lie between 18 and 22 nm, with a mean thickness of 19.5±1.4 nm.

At polymerization times much longer than 60 min, the composite particles grow together to form long pseudo-one-dimensional strings of nanoparticles. Thus, it is an aspect of the present invention to provide such clusters or strings of nanoparticle composites or hollow nanocapsules. The clusters or strings of nanoparticle composites or hollow nanocapsules can be loaded with guest molecules in accordance with the methods of the present invention.

Solution-Phase Synthesis of Polymer-Gold Particle Composites

Although the solid-support method for synthesizing polymer-gold particle composites yields a material that is extremely easy to manipulate and characterize, there are advantages of developing homogeneous solution-phase routes to polymer-nanostructure composites. For example, thin shells of polymers can be grown on nanoscale materials that will not easily fit in a porous support membrane, such as high aspect ratio metal nanowires or carbon nanotubes.

Solution-phase routes to polymer-coated nanostructures comprise combining an aqueous solution containing a monomer and nanoparticle templates. For example, 7.5 µL pyrrole and 2 mL of 10 nm diameter gold particles were combined in 5 mL of $H_2O$ with 10 mL of 0.1 M aqueous Fe(ClO$_4$)$_3$. Every particle was again coated with polymer. Substantial particle agglomeration was prevented by adding 0.5 g of the steric stabilizer poly(vinylpyrrolidone) to the gold suspension.

Multi-Layer Synthesis

The methods of the present invention also provide for the synthesis of spatially well-organized multilayer composite polymer nanoparticles. The method employing a solid support membrane is preferred in that it makes the synthesis of multilayer composites particularly easy as one monomer solution can quickly be replaced with a second or third monomer. FIGS. 4A–4B and 7A–7B show polypyrrole/poly(N-methylpyrrole) multilayer nanoparticles. These are interesting structures because the polymer formal potentials are such that neutral poly(N-methylpyrrole) can exist in contact with oxidized polypyrrole. Thus, composite nanoparticles with ionic cores and neutral shells, or vice-versa, can be obtained. It is envisioned in accordance with the present invention, that partitioning and release of small molecules in these materials depends (i.e., can be controlled) on the sequence and redox states of the two polymers.

FIG. 3A is a TEM image after 15 min of poly(pyrrole) polymerization. The mean shell thickness is 35±1.8 nm.

FIG. 3B is a TEM image of an identical gold-loaded support membrane treated with pyrrole for 15 min followed by N-methylpyrrole. The nanoparticle composite contains more polymer, as indicated by UV-visible spectroscopy, and has a much thicker shell, i.e. 55±3.9 nm.

Dissolution of Nanoparticle Template

Conductive polymer-gold particle composites are converted to hollow polymer capsules via dissolution of the nanoparticle template. For example, conductive polymer-gold nanoparticle composites are converted to hollow polymer nanocapsules by soaking a solid support membrane containing composite particles in an aqueous solution of 0.1 M KCN/0.001 M $K_3$[Fe(CN)$_6$], or other suitable etchant or solvent for the nanoparticle template. Gold dissolution occurs via transport of etchant species through the polymer shell to the core, where $Au^0$ is converted to $[Au(CN)_4]^-$. This is evidenced by a loss of the gold absorbance at about 550 nm (FIGS. 5A–5B) and by the observation of a hollow core by TEM (FIGS. 9A–9C). Transport rates of the etch solution through the polymer shell are also described in the Examples.

The structural integrity of the capsule is maintained following gold dissolution. FIGS. 9A–9C set forth TEM micrographs of hollow poly(pyrrole) capsules templated from 5 nm (FIG. 9A), 30 nm (FIG. 9B), and 200 nm (FIG. 9C) diameter gold particles. The diameter of the resulting hollow capsule core is identical with that of the initial particle template. An imprint of the particle crystal facets is also clearly present in many capsules.

Any suitable solvent or etchant can be employed to dissolve the nanoparticle template. For example, $HNO_3$ can be used for dissolving silver (Ag) particles and ascorbic acid can be used for dissolving $Fe_2O_3$ particles. Typically the solvent or etchant is chosen based on the contemplated end use for the nanocapsule. The solvent or etchant can be biologically compatible when the nanocapsule is to be used for biological applications. Representative etchants are also disclosed in the Examples.

Guest Entrapment

The present novel invention represents the first demonstration of the use of a nanoparticle as a template material that also can be employed to deliver guest molecules into a nanocapsule core. Ligands bound to, coated upon, conjugated to, or otherwise carried by the template particle surface prior to capsule shell formation remained trapped inside the hollow capsule following capsule shell formation and template material dissolution.

In a preferred embodiment, guest molecules are bound to a gold nanoparticle template prior to polymerization, and remain in the hollow capsule core following gold etching. Rhodamine B was attached covalently to 30 nm diameter gold particles via thiolate linkages and encapsulated in poly(N-methylpyrrole) (Example 3). Following exposure to gold etch solution, visible spectroscopy and transmission electron microscopy revealed that the rhodamine B was not displaced by the polymer, but that it remained in the hollow core (FIG. 4B). Thus, the gold particles are not only useful template materials for synthesizing polymer-metal hybrid nanoparticles, but can be employed to delivery molecules inside the capsule core.

Guest Candidates

Protein or peptide guest candidates are selected from a wide variety of proteins or peptides. Those having antigenic properties are preferred when a vaccine is required. The protein can be the viral protein coat from a selected virus or immunogenic portion thereof. The viral protein coat is isolated according to known separation procedures for isolating and separating viral proteins. The viral coating is the preferred protein because the viral coating is where the antigenic activity of viruses is known to be located. Typically, the virus is digested or solubilized to form a mixture of viral proteins. The viral proteins are then separated by liquid chromatography or other conventional process into the various protein particle fractions and dialyzed to remove impurities.

Suitable viruses from which viral protein particles can be separated and isolated include Epstein-Barr virus, human immunodeficiency virus (HIV), human papilloma virus, herpes simplex virus and pox-virus. Preparations of a wide variety of antigenic protein materials may also be purchased commercially from supply houses such as Microgene Systems, Inc., West Haven, Conn., Amgen Corporation, Thousand Oaks, Calif. and Cetus Corporation, Emeryville, Calif.

Other biologically active proteins and peptides that can be encapsulated as guests include but are not limited to enzymes, hormones, transport proteins and protective proteins. Human serum transferrin, plasminogen activator and coagulation factors, in addition to the pharmacologic agents amphotericin and insulin, are examples.

Other guest candidates include but are not limited to drugs, polynucleic acid constructs and vectors (such as gene therapy vectors), dyes, imaging agents (including paramagnetic, radioactive and fluorogenic chemical species), chemotherapeutic agents, toxins, radiotherapeutics, radiosensitizing agents or other suitable agent. Each agent is loaded in a total amount effective to accomplish the desired result in the target tissue, whether the desired result be imaging the target tissue or treating the target tissue. As noted above, an aspect of the present invention pertains to particle size in that it has been shown that liposome drug delivery systems with diameters between 50 nm and 100 nm are transported into tumor cells selectively. Freakes, D. A. et al., *Proc. Natl. Acad. Sci. USA*, (1995) 92:1367. Thus, guest candidates that are particularly suitable for delivery to tumor cells and tissues are envisioned in accordance with the present invention.

Candidate guest molecules can also include metal catalyst particles that can extend the life of the particle by preventing particle agglomeration. Such catalyst particles can be used in nanoparticle composites or nanocapsules in chemical catalysis or size-selective environmental waste removal, among other applications.

The synthesis methods of the present invention thus exhibit substantial versatility. Core diameters from about 5 to 200 nm, shell thicknesses from about 5 to 100 nm, and multilayers of chemically distinct capsule shell materials (e.g. polymers, such as poly(pyrrole)/poly(N-methylpyrrole)) are synthesized routinely using the methods of the present invention. Transport rates of small molecules into the capsule core are also affected by the oxidation state of the conductive polymer, a useful feature in many molecular uptake and release scenarios. Finally, not only is the nanoparticle a useful template material, but it also can be employed to deliver guest molecules into the capsule core, as disclosed herein below.

It is thus an aspect of the methods for synthesizing new nanostructured composite particles and capsules of the present invention to blend several different materials, each with a specific property, into a single multi-functional particle. Thus, a single nanoparticle composite or nanocapsule can contain a drug molecule loaded in the core, a bioproductive shell and an endocytosis-promoting protein attached to the exterior. Using the present inventive synthetic methods, such a composite is available in any size from about 1 nm to about 1000 nm.

Other composites tailored for applications in chemical catalysis or size-selective environmental waste removal are also contemplated. For example, a hollow polymer capsule containing a single metal catalyst particle can extend the life of the particle by preventing particle agglomeration. Finally, it is noted that other nanoscopic material such as gold nanowires and carbon nanotubes can be coated with insulating polymers using the present inventive methods. This can be important for preventing crosstalk in nanoscopic electronic devices.

II. EXAMPLES

The following Examples have been included to illustrate preferred modes of the invention. Certain aspects of the following Examples are described in terms of techniques and procedures found or contemplated by the present inventors to work well in the practice of the invention. These Examples are exemplified through the use of standard laboratory practices of the inventors. In light of the present disclosure and the general level of skill in the art, those of skill will appreciate that the following Examples are intended to be exemplary only and that numerous changes, modifications and alterations can be employed without departing from the spirit and scope of the invention.

The following Examples determine transport rates and equilibrium sorption amounts of molecules into solid conductive polymer-gold nanoparticle composites (i.e., loading). The following Examples also explain transport rate and molecular weight cutoff measurements for use in evaluating diffusion into and out of the hollow nanocapsules of the present invention, including conductive polymer nanocapsules. An aspect of the present invention thus pertains to "tunable" transport rates and sorption amounts via the sequence of multilayers, polymer oxidation state, polymer thickness, polymer counter-ion interactions and hollow core volume. The following Examples also include measurements of solvent dielectric confinement effects and rotational diffusion in hollow nanocapsules.

Materials and Methods Employed in Examples

Chemicals. Gold nanoparticles were synthesized using $HAuCl_4$ and a citrate-reducing agent as described by Marinakos, S. M. et al., *AdV. Mater.* 11:34 (1999); Marinakos, S. M. et al. *Chem. Mater.* 10:1214 (1998), or were purchased from Vector Labs. $HAuCl_4$, sodium citrate, $Fe(ClO_4)_3$, $NaBH_4$, KCN, $K_3[Fe(CN)_6]$, pyrrole, and N-methylpyrrole were purchased from Aldrich Chemical Co. of St. Louis, Mo. and used as received. Poly (vinylpyrrolidone) with Mw 40,000 was purchased from Acros of Pittsburgh, Pa.

Rhodamine B capped gold nanoparticles were synthesized by first exchanging mercaptoethylamine onto sulfonyl triphenylphosphine stabilized gold nanoparticles. This was accomplished by rapidly stirring sulfonyl triphenylphosphine (Aldrich Chemical Co. of St. Louis, Mo.; 1 mg/mL in $H_2O$) with 10 mL of gold sol. Rhodamine B isothiocyanate (Aldrich Chemical Co. of St. Louis, Mo.; 4.6 mg in 5 mL of ethanol) was then added to 10 mL of 0.3 nM nanoparticles. Reaction of isothiocyanate and amine moieties yielded gold nanoparticles containing an average of 15,000 covalently attached rhodamine B ligands, as determined by visible spectroscopy. Aluminum oxide membranes were purchased from Fisher Scientific of Pittsburgh, Pa.

Instrumentation. Transmission electron micrographs (TEM) were acquired on a PHILIPS CM12™ electron microscope available from Philips of Hillsboro, Oreg. Samples were prepared for analysis by placing several drops of the particle suspension on a Formvar-coated Cu grid and quickly wicking away the solvent with filter paper. To image hollow polymer capsules, a grid containing polymer-gold particle composites was dipped in 0.1 M KCN/0.001 M $K_3[Fe(CN)_6]$ gold etching solution for periods up to 5 min. Longer exposure completely removes the Formvar coating. UV-visible spectra were recorded with a HEWLETT PACKARD HP 8450 diode array spectrophotometer, available from Hewlett Packard of Palo Alto, Calif.

Transport Measurements. All transport measurements were conducted on 30 nm diameter polymer-coated gold particles immobilized in porous $Al_2O_3$ membranes. Transport rates for $K_3[Fe(CN)_6]$/KCN (the "etchant solution") were measured by placing the membrane in a quartz cuvette, pipetting 1 mL of etchant solution into the cuvette, and monitoring the disappearance over time of the gold plasmon absorption at about 550 nm. Experiments on neutral poly (N-methylpyrrole) were performed by reducing poly(N-methylpyrrole-$ClO_4$)with aqueous $NaBH_4$ for at least 30 min prior to removing the gold particle.

EXAMPLE 1

Molecular Transport Rates into Solid Conductive Polymer-Gold Nanoparticle Composites Transport rates for small molecules diffusion into conductive polymer-encapsulated gold nanoparticle composites are measured by monitoring the disappearance of the gold plasmon absorption vs. time when the composites are placed in a solution of gold etchant. Data for etchant $K_3[F_3(CN)_6]$/KCN are shown in FIGS. 5A–5B. These data are for 30 nm diameter gold particles encapsulated with neutral poly(N-methylpyrrole); similar data have been acquired for 200 nm diameter particles.

The measurements of transport rates through conductive polymer nanoparticles are extended also to other polymers (polypyrrole, polyaniline, etc.), thicker polymer shells, a variety of counter ions (e.g., $NO_2^{1-}$, $Cl^{1-}$, p-toluenesulfonate, polystyrenesulfonate), larger gold oxidizing agents (e.g., trisbipyridylruthenium(III) and bulkier polyether substituted bipyridines) and multilayer polymer-gold particle composites. Varying these parameters systematically determines polymer composition-molecular transport property relationships, including the size at which a molecule is completely excluded from entering the bulk of the capsule. All of the transient sorption data are fit to well-known models of diffusion in polymers to quantitate and compare diffusion rates through these materials. A summary of experiments is presented in Table 1 hereinbelow.

TABLE 1

Summary of Transport Experiments in Conductive Polymer/Gold Particle Composites

| Transport Experiments | Variables | Analysis |
|---|---|---|
| $K_3[Fe(CN)_6]$/KCN through Conductive Polymers | Polymer Thickness | Transport rate as limiting step. |
| | Polymer oxidation state | Switching of transport rates. |
| | Counter ion | Influence of counter ion on transport rate. |
| Large gold etchants through Conductive Polymers; e.g., $[Ru^{III}(bpy)_3]^{3+}$ and 4,4-polyether-substituted bpy's (bpy = 2,2'-bipyridine) | Etchant size and charge | Molecular weight cutoffs for transport. |
| Multilayer Sequence | Polymer sequence; i.e., polypyrrole/poly(N-methylpyrrole) | Tailoring of transport rates by multilayer sequence |

EXAMPLE 2

Transport Rates of Gold Etchant into Conductive Polymer-Gold Particle Composites An aspect of the conductive polymer nanocapsule of the present invention pertains to affecting small molecule transport rates by switching the oxidation state of the polymer. To characterize transport rates in poly(N-methylpyrrole) and poly(pyrrole) capsules, the gold plasmon absorption was monitored over time following exposure to the gold etch solution. FIGS. 5A–5B show that transport rates of etchant through poly(N-methylpyrrole)-coated gold nanoparticles depend on polymer oxidation state, those rates being faster for the neutral polymer. These results were rationalized by considering the relative densities of neutral vs oxidized poly(N-methylpyrrole). While applicants do not wish to be bound by any particular theory of operation, neutral poly (N-methylpyrrole) is known to contain a larger amount of void volume compared to oxidized poly(N-methylpyrrole) (Eisenberg, A. et al., *Macromolecules* (1990) 23:4098), and this difference is envisioned to play a role in the the transport rates seen here observed here.

The data in FIG. 5A were treated quantitatively using the following model for diffusion in a sphere (Crank, J. and Park, G. S., *Diffusion in Polymers;* Academic Press: New York (1968); Crank, J. *Mathematics of Diffusion;* Oxford University Press: London (1956)):

$$1-(C_t-C_0/C_s-C_0)=b\exp(-A_t); A=D\pi^2/r^2 \qquad \text{Equation (1)}$$

where $C_t$ is the concentration of diffusing species at time t, $C_s$ is surface concentration, $C_0$ is the diffusant concentration at the film/particle interface at t=0, and b is a constant dependent on the initial boundary conditions employed in solving Fick's laws. Under these experimental conditions, $C_0$ may be set to 0 and the LHS of (1) may be related to the gold plasmon intensity. Thus, $$abs_t/abs_0=b\exp(-A_t) \qquad \text{Equation (2)}$$

where $abs_0$ and $abs_t$ are the gold plasmon absorbances prior to etching and at some time t during etching, respectively.

Table 2 below compares diffusion coefficients for gold etchant diffusing into conductive polymer capsules. The data fit eq (2) remarkably well (R=0.997), considering the extinction coefficient of the gold particle is undoubtedly changing during the experiment (FIG. 5B). Diffusion coefficients are calculated to be roughly 3 times smaller through the oxidized polymer capsule versus the neutral capsule. This difference in diffusion rate is in fact diminished because the neutral poly(N-methylpyrrole) is partially redoped by the ferricyanide etchant. In addition, diffusion through oxidized poly(pyrrole) is much slower compared to that through oxidized poly(N-methylpyrrole), a difference which can again likely be attributed to their relative porosities. Notably, the diffusion coefficients given in Table 2 agree well with those reported for other molecules diffusing through much thicker (micrometers) poly(pyrrole) and poly(N-methylpyrrole) films. See e.g., Feldheim et al., *J. Phys. Chem.*, 98:5714 (1994).

TABLE 2

Diffusion Coefficients. D. for Various Polymer Nanocapsule Compositions

| capsule composition | D (cm 2/s) |
| --- | --- |
| poly(N-methylpyrrole-ClO$_4$) | 5.0 × 10$^{-12}$ |
| poly(N-methylpyrrole) | 1.5 × 10$^{-11}$ |
| poly(pyrrole-ClO$_4$) | 1.8 × 10$^{-14}$ |

EXAMPLE 3

Guest Entrapment

The focus of this Example was to evaluate whether particle-bound ligands are displaced from the gold surface upon polymer formation, or if they remain attached to the particle surface and are ultimately trapped inside the hollow polymer capsule following gold dissolution. Rhodamine B was chosen as a guest because of its absorbance at about 556 nm, a region of relatively low absorptivity for poly(N-methylpyrrole). FIG. 4A shows visible spectra for 30 nm diameter gold particles (line A), rhodamine B-capped gold (line B), poly(N-methylpyrrole)-rhodamine B composite particles (line C), and poly(N-methylpyrrole) capsules following gold etch (line D). Following polymer formation, absorptions for 30 nm diameter gold particles (about 545 nm shoulder), oxidized poly(N-methylpyrrole), and rhodamine B were observed, implying that polymer formation does not cause surface-bound ligands to desorb from the particle. The rhodamine B absorption peak is also clearly evident after removing the gold core (line D).

Visible spectroscopy indicates that rhodamine B is present following polymer formation and gold core dissolution. However, it does not provide information on the location of rhodamine B in the nanoparticle. To address this question, rhodamine B loaded capsules were stained with aqueous CsOH for 48 h. Cs$^+$ is a known marker of carboxylic acid groups, rendering them visible by electron microscopy. FIG. 4B shows that rhodamine B remained in the hollow core following gold etching. No stain was observed in identical samples that were not loaded with rhodamine B. In contrast to K$_3$[Fe(CN)$_6$]/KCN transport rates, which are relatively fast and are affected by the oxidation state of the polymer shell, rhodamine B was trapped inside the capsule for over 3 weeks, irrespective of polymer oxidation state.

To test for a chemisorption mechanism compared to entrapment based on sterics, poly(N-methylpyrrole) capsules were soaked in rhodamine B (1 M in ethanol), rinsed, and immersed in pure ethanol. Visible spectra of the capsules revealed that rhodamine B was completely desorbed from the film within 24 h. These observations suggest that rhodamine B is trapped sterically within the poly(N-methylpyrrole) nanocapsules.

EXAMPLE 4

Trapping of Molecules and Enzymes in Nanoparticle Composites and Nanocapsules

An important aspect of the present invention is that the nanoparticle template can be removed to yield hollow nanocapsules with inner and outer diameters that are selected in accordance with a contemplated end use. Moreover, as demonstrated above with rhodamine B, the nanoparticle template can be employed to delivery reagents inside the capsule core.

These aspects of the present invention are further evaluated by preparing horseradish peroxidase—gold nanoparticle conjugates using known procedures. Note a potential caveat to these protocols is that they yield particles with enzyme weakly physisorbed to the surface. The conjugates are then encapsulated by conductive polymers and the gold removed as described above.

Horseradish peroxidase activity is not degraded by contact with K$_3$[Fe(CN)$_6$]/KCN or pyrroles. However, exposure to the Fe$^{III}$ polymerization initiator completely destroys enzyme activity. Sodium persulfate is thus utilized for polymerization initiation. Once the enzyme is immobilized inside the hollow polymer capsule, enzymatic activity is analyzed with a commercial assay kit. The amount of enzyme in the hollow capsules, turnover numbers (k$_{cat}$) and apparent dissociation constants (K$_m$) are determined and compared to values obtained for unencapsulated enzyme attached to gold particles and to free enzyme in solution.

Interestingly, values of K$_{cat}$ and K$_m$ are known to decrease upon confining enzymes to small volumes (e.g., in sol gels), an issue that is addressed by judicious choice of capsule volume. If the amount of enzyme in the capsule is low compared to that expected given the initial amount of enzyme on the particle, the weakly physisorbed enzyme can be displaced from the gold particle during polymer formation. To obviate this potential issue, a covalent method of immobilizing horseradish peroxidase onto gold surfaces is employed. Enzyme activity is then monitored in time in a variety of polar and nonpolar solvents to determine the feasibility of protecting a biomolecule from the surrounding dielectric environment.

As a demonstration of enzyme immobilization, horseradish peroxidase (HRP)/gold particle conjugate have been synthesized and encased in Ppy. Because HRP is known to be stable on gold particles, the gold was not removed from the capsule. A standard assay (available from Sigma Chemical Company of St. Louis, Mo.) was used to test the activity of HRP. Active, immobilized HRP was clearly evident from the assay.

Identical experiments are performed on proteins covering a wide range of molecular weights (bovine serum albumin, MW 67,000 Da; IgG, MW 150,000 Da; Fg, MW 350,000 Da). These experiments assess the molecular weight limits to enzyme diffusion through the polypyrrole (Ppy) shell. Understanding size limitations is important in ensuring the desired enzyme remains inside the capsule while keeping immunoglobulins out. Recognized assay methods are used to evaluate enzyme activity, such as those disclosed in Pathak et al., *J. Am. Chem. Soc.* (1992) 114:8311.

EXAMPLE 5

Small Molecule Release—Model Systems of Drug Delivery

To evaluate kinetics and the extent of small molecule release, the fluorescent dye 1-aminopyrene is attached to gold nanoparticles and encapsulated in polypyrrole (Ppy) using the solid support method described above. Amines are preferred because they have a high affinity for gold particles. The particles are resuspended in an aqueous solution and pyrene fluorescence is monitored versus time. To initiate the release of pyrene, a solution containing dilute KCN is added to the particle suspension. The gold particles are converted to soluble $[Au(CN)_4]^-$, the fluorescence intensity from pyrene can be very low due to concentration quenching. As the pyrene diffuses out of the capsules, the fluorescence intensity increases as the pyrene enters dilute solution. FIGS. 8A–8B present a reaction schematic and a graphical schematic, respectively, of this approach.

Relativity intensity versus time is monitored and fit to the following diffusional model equation:

$$I(t)=I_\infty-(\sigma_w-\sigma_v)\exp(-p/v_c)t \qquad \text{Equation (3)}$$

where $I_\infty$ is the fluorescence intensity of pyrene after it is completely released into the aqueous phase; p the permeability measured in $cm^3/s$; $v_c$ the capsule volume; and $\sigma_w$ and $\sigma_v$ denote fluorescence quantum yields in bulk water and inside the capsule, respectively. The total amount of pyrene released can be quantitated with $I_\infty$ using calibration standards.

Experiments are performed systematically on the oxidized and neutral forms of Ppy, using different solvents ($H_2O$, $CH_3CH_2OH$), incorporating a variety of counteranions ($A^-$) to oxidized Ppy ($A^-=Cl^-$, p-toluenesulfonate, polystyrenesulfonate, etc.), and using neutral, anionic and cationic pyrene molecules to determine the effects of these variables on capsule permeability and extend of release. Prior studies on gas transport in Ppy have shown that polymer oxidation state and counter ion have pronounced effects on permeability. Similar influences on transport rates are envisioned. In addition, the effects of Ppy shell thickness and inner core diameter on release rates are investigated. A summary of these experiments is provided in Table 3 below.

TABLE 3

Studies of Release Rates in Ppy Capsules

| Release Comparison | Effect on Release Rate |
| --- | --- |
| Neutral pyrene, ethanol solvent, compare cationic Ppy to neutral Ppy | Release significantly faster in neutral Ppy due to a 25% drop in density compared to oxidized Ppy. |
| Oxidized Ppy, ethanol solvent, compare neutral, cationic and anionic forms of substituted pyrene | Release fastest for the anionic form of pyrene because oxidized Ppy is an anion conductor. |
| Neutral pyrene, ethanol solvent, compare Ppy-Cl, Ppy-ClO$_4$, and Ppy-p-toluenesulfonate | Ppy-p-toluenesulfonate and Ppy-ClO$_4$ are more densely packed than Ppy-Cl. |

EXAMPLE 6

Synthesis of Multilayer Composite Polymer Nanoparticles

An aspect of the methods of the present invention is that it is possible to grow multilayers of chemically distinct polymers over the template nanoparticle. For example, bilayer polymer colloids comprising an inner layer of polypyrrole (Ppy) and an outer layer of poly(N-methylpyrrole) (PNMP), and vice versa, have been synthesized (FIGS. 7A–7D).

PNMP is also an electronically conductive polymer which may exist in two oxidation states. However, the oxidation potential of PNMP is about 700 mV more positive than Ppy. Thus, for a bilayer of PNMP/Ppy, it is possible to have both polymers oxidized, neutral PNMP/oxidized Ppy or both polymers neutral. The oxidation state determines the relative hydrophobicity of the polymer; the oxidized form is relatively hydrophilic compared to the neutral form. Thus, these combinations can be considered hydrophilic/hydrophilic, hydrophobic/hydrophylic and hydrophobic/hydrophobic. Stated differently, the chemical properties of the nanoparticle core and shell can be tuned independently simply by considering the redox properties of each individual polymer.

A variety of drug release scenarios are envisioned for such a chemically diverse system. For example:

1. The core polymer can be made cationic (Ppy), with the anionic drug agent ($A^-$) employed as the charge compensating anion, while the exterior polymer is neutral (PNMP, FIG. 7A). ($A^-$) is protected from exchange by anions too large to diffuse through the shell, but is released by anions or reducing agents small enough to penetrate into the core.

2. The core can be made neutral (PNMP) and the shell oxidized (Ppy). This system is contemplated to analogous to a micelle, with a hydrophobic interior and hydrophylic exterior (FIG. 7B). Neutral molecules are loaded preferentially into the core from solution and the suspension collected and used later as a diffusional drug delivery device.

3. Both polymers can be made cationic, with different anionic drugs loaded into each polymer layer (FIG. 7C).

4. Finally, four or more layers can be synthesized, alternating in Ppy-$A^-$ and PNMP. The potential thus exists in a composition of matter of the present invention to have two different drug release rates, one immediate and one at some time(s) later (FIG. 7D). This aspect can be valuable, for example, in vaccinations which require a second booster some time after the initial dose. Often, patients do not return for follow-up injections and lose all benefits of the vaccine. A single injection that essentially acts as two separate doses solves this problem.

The four release mechanisms listed above are tested experimentally using fluorescent dye molecules such as pyrene or rhodamine B. Kinetics of uptake and release and partition coefficients are characterized using fluorescence spectroscopy. The initial location of dye in each composite material is monitored with TM by staining with CsOH as described above and by Ding and Liu, *J. Phys. Chem.* (1998) 102:3107.

EXAMPLE 7

Equilibrium Sorption Amounts

Small molecule equilibrium uptake amounts are characterized by stirring a known quantity of polymer-encapsulated gold nanoparticles (prior to removing the gold particle) in ethanol with small relatively hydrophobic molecules (e.g., pyrene, pyridine, anthraquinone), and small relatively hydrophilic molecules (e.g., hydroxypyrene, chloropyridine, hydroxypyridine). Equilibrium sorption amounts are quantitated by centrifuging the particles from solution and measuring changes in solution concentration of the target molecule. Monitoring loading amount versus solution concentration determines which sorption isotherm is operating (i.e., Type I, Type II). Measuring small molecule sorption amounts versus polymer shell thickness confirms that molecules are loaded into the bulk of the polymer shell and are not simply bound to surface regions.

These experiments are performed first for oxidized and reduced polypyrrole/gold composites in that it is envisioned that equilibrium loading of hydrophobic molecules is larger in the non-ionic form of polypyrrole. Loading is then quantified in oxidized and neutral forms of more lipophilic N-alkylpyrroles (where alkyl is methyl, ethyl, propyl, etc.). Polymers with a large difference in loading between their two redox forms are identified. This characteristic is exploited for extracting a molecule from one solution (e.g., contaminants), and then releasing it to a second solution by switching the oxidation state of the polymer either chemically or electrochemically.

Equilibrium sorption amounts of small molecules in multilayer polymer nanoparticles and hollow polymer capsules are also measured. Multilayer composites can be used to improve the selectivity of small molecule absorption. For example, the composite multilayer systems shown in FIG. 8A can allow small neutral molecules to partition into the hydrophobic core to the exclusion of cationic molecules or even larger neutral molecules. This approach is tested initially by stirring a suspension of multilayer particles in a solution containing pyrene and the cationic 1-aminopyrene with the expectation that pyrene is preferentially removed from solution. A summary of the evaluation of equilibrium sorption amounts of adsorbates into composite polymer nanoparticles and capsules is shown in Table 5 below.

TABLE 4

Evaluation of the Equilibrium Sorption Properties of Conductive Polymer/Gold Nanoparticle Composites and Hollow Polymer Capsules

| Sorbent Materials | Variables | Analysis |
| --- | --- | --- |
| Polypyrrole/Au | Adsorbate concentration | Sorption isotherm. |
|  | Polymer shell thickness | Surface or bulk adsorption. |
|  | Polymer oxidation state/counter ion | Change in partition coefficient with dopant. |
|  | Adsorbate polarity | Chemical or ion permselectivity. |
| Oxidized polypyrrole/ reduced poly(N-methylpyrrole) bilayer | Adsorbate polarity | Concentration of adsorbates in one polymer layer. |
|  | Mixture of adsorbates of different size/charge | Selective extraction of adsorbates. |
| Hollow polymer capsules | Adsorbate concentration | Isotherm behavior. |

EXAMPLE 8

Molecular Dynamics and Solvent Dielectric Properties in Spatially Confined Volumes Understanding how the dielectric constant of a solvent can change when spatially confined pertains to the chemistry that can be performed inside the nanocapsules of the present invention. For example, enzyme function is dependent on the dielectric properties of the solvent in which it is placed. The hollow polypyrrole nanocapsules of the present invention are particularly suitable for studies of solvent confinement because the hollow core volume can be tuned from about $10^{-28}$ L to about $10^{-21}$ L, and the capsule can be switched between an insulator and conductor.

The dielectric constant of water inside the hollow capsule is characterized by trapping an $\omega$-betaine alkylthiol inside the capsule and monitoring shifts in $\lambda_{max}$. Crowther, D. and Liu, X., *Chem. Comm.* (1995) 2445; Reichardt, C., *Solvents and Solvent Effects in Organic Chemistry*, VCH Publishing; Weinhem, FRP (1988). As observed previously in micellar systems (Ristori, E. and Martini, G., *Langmuir* (1992) 8:1937), a reduction in solvent dielectric constant as capsule volume decreases is envisioned. An intriguing difference in the nanocapsules of the present invention is that conductive polymer capsules enable studies of microenvironments in containers with highly charged or electrically neutral walls. The oxidized form of polypyrrole, for example, can crease an electrical double layer inside the capsule. If the capsule core is small enough, the solvent dielectric constant is much lower than the same capsule in its insulating form.

The translational freedom of molecules confined in the small-volume capsule is also characterized. This is of basic interest to emerging "laboratory on a chip" schemes, where one goal is to conduct synthetic reactions in small volume polymeric or glass vessels. As reaction vessel size decreases, and the frequency of molecular collisions increases, interactions between reactant molecules and the container begins to play a larger role. The hollow polymer capsules loaded with small molecules of the present invention are preferred for studying these interactions.

As an initial step at characterizing molecule-nanocapsule interactions, neutral and cationic nitroxide radicals and anionic galvinoxide radicals are loaded into hollow polypyrrole capsules. This can be accomplished by attaching galvinoxide- or nitroxide-terminated alkylthiols to gold particles (Brousseau, L. C., III, et al., *J. Am. Chem. Soc.* (1998) 120:7645), polymerizing polypyrrole around the particles, and then etching the gold particle. Electron paramagnetic resonance (EPR) is then used to characterize the concentration and dynamics of radicals in a capsule. See e.g. Bosman, A. W. et. al., *Macromolecules* (1997) 30:3606. The data obtained from detailed EPR line shape analyses includes:

1. rotational diffusion coefficients—these determine if molecules are diffusing freely or are stuck to the inner capsule wall;
2. hyperfine coupling constants—these are a measure of solvent polarity inside the capsule. These parameters are determined for cationic and anionic radicals, neutral and charged capsule walls, and capsule volumes ranging from $10^{-28}$ L (5 nm diameter core) to $10^{-21}$ L (200 nm diameter core).

EXAMPLE 9

Encapsulation of Enzymes

Poly(pyrrole)-encapsulated horseradish peroxidase was prepared in accordance with the methods of the present invention disclosed herein above, including Example 4. The activity of the poly(pyrrole)-encapsulated horseradish peroxidase was evaluated through the analysis of a one-electron oxidation product of 3,5,3',5'-tetramethylbenzidine.

FIG. 10A is a plot of absorbance vs. wavelength. This plot shows that horseradish peroxidase remains active inside a poly(pyrrole) capsule. FIG. 10B is a schematic representation of a poly(pyrrole) capsule having active horseradish peroxidase HRP therein.

EXAMPLE 10

Diffusion Coefficients

Diffusion coefficients of small molecules through poly (pyrrole) and poly(N-methylpyrrole) capsules synthesized with different anions show that small molecule transport rates can be controlled by both polymer oxidation state and the anion incorporated into the polymer. Diffusion coefficient data are set forth in Table 5 immediately below.

TABLE 5

| Polymer | D (cm$^2$/s) × 10$^{11}$ |
|---|---|
| PNMP | 1.5 |
| PNMP-ClO$_4$ | 0.5 |
| Ppy- NO$_3$ | 0.01 |
| Ppy- ClO$_4$ | 0.002 |
| Ppy-SO$_4$ | 0.003 |
| Ppy-Cl | 0.004 |

SUMMARY OF EXAMPLE

The synthesis and transport properties of poly(pyrrole)- and poly(N-methylpyrrole)-gold particle composite particles and hollow nanocapsules have been disclosed in accordance with the present invention. The present inventive synthetic methods thus enable excellent control over particle dimensions (e.g., shell thickness, hollow core diameter, and polymer sequence) and provide the ability to trap small molecules in the hollow capsule core. Extension of these methods to the entrapment of enzymes, proteins, DNA, and metal catalyst particles is also disclosed in accordance with the present invention. Finally, although the biocompatability of poly-(pyrrole) has not been established previously, T3 fibroblasts have been observed to ingest poly-pyrrole-gold composite particles without compromising subsequent T cell division.

REFERENCES

The publications and other materials used herein to illuminate the background of the invention, and in particular cases, to provide additional details respecting the practice, are incorporated herein by reference, and for convenience, are referenced by author and year of publication in the foregoing text, and respectively listed by citation below.
Bosman, A. W. et. al., *Macromolecules* (1997) 30:3606
Brousseau, L. C., III, et al., *J. Am. Chem. Soc.* (1998) 120:7645
Caruso, F. et al. *Science* (1998) 282:1111
*Chem. Eng. News* (1999) 77:32
Cohen, S. et al., *J. Am. Chem. Soc.* (1990) 112:7832.
Crank, J. *Mathematics of Diffusion;* Oxford University Press: London (1956))
Crank, J. and Park, G. S., *Diffusion in Polymers;* Academic Press: New York (1968)
Crowther, D. and Liu, X., *Chem. Comm.* (1995) 2445
Ding, J. et al., *Macromolecules* 1998, 31:6554.
Ding and Liu, *J. Phys. Chem.* (1998) 102:3107
Discher, B. M., et al., *Science* (1999) 284:1143
Donath, E. et al., *Angew. Chem., Int. Ed.* 1998, 37:2202.
Eisenberg, A. et al., *Macromolecules* (1990) 23:4098)
Feldheim et al., *J. Phys. Chem.,* 98:5714 (1994)
Freakes, D. A. et al., *Proc. Natl. Acad. Sci. USA,* (1995) 92:1367
Giersig, M. et al. *Adv. Mater.* (1997) 9:575
Gill, I. and Ballesteros, A. *J. Am. Chem. Soc.* (1998) 120:8587
Gopferich, A. et al., *Pharm. Res.* (1994, 11:1568.
Harada, A. and Kataoka, K. *Science* (1999) 283:65
Hayashi, C., *J. Vac. Sci. Technol. A*5 (4), July/August 1987, pp.1375–1384
Hayashi, C., *Physics Today,* December 1987, pp. 44–60
Hotz, J. and Meier, W. *Langmuir* (1998) 14:1031
Kataoka, K. et al. *J. Am. Chem. Soc.* (1998) 120:12694
Kmiec, E. B., *Am. Sci.* (1999) 87:240
Langer, R. *Science* (1990) 249:1527
Langer, R. *Acc. Chem. Res.* (1993) 26:537
Macknight, W. J., et al., *Acc. Chem. Res.* (1998) 31:781
Marinakos, S. M. et al., *Adv. Mater.* 11:34 (1999)
Marinakos, S. M. et al. *Chem. Mater.* 10:1214 (1998)
Martin, C. R. and Parthasarathy, R. V. *Adv. Mater.* (1995) 7:487
Morris, C. A. et al., *Science* (1999) 284:622
*MRS Bulletin,* January 1990, pp. 16–47
Pathak, C. P., et al. *J. Am. Chem. Soc.* (1992) 114:8311
Peppas, N. A. and Langer, R. *Science* (1994) 263:1715
Reichardt, C., *Solvents and Solvent Effects in Organic Chemistry,* VCH Publishing Weinhem, FRP (1988)
Ristori, E. and Martini, G., *Langmuir* (1992) 8:1937
Sahoo, S. K. et al., *J. Colloid Interface Sci.* (1998) 206:361
Thurmond, K. B., II, et al. *J. Am. Chem. Soc.* (1997) 119:6656
Zhao, M., et al. *J. Am. Chem. Soc.* (1998) 120:4877

It will be understood that various details of the invention may be changed without departing from the scope of the invention. Furthermore, the foregoing description is for the purpose of illustration only, and not for the purpose of limitation—the invention being defined by the claims.

What is claimed is:

1. A composition of matter comprising:
   (a) a nanoparticle template;
   (b) a shell formed on the nanoparticle template by polymerizing a monomer on the nanoparticle template; and
   (c) a guest molecule, wherein the nanoparticle template carries the guest molecule and the guest molecule is encapsulated by the shell.

2. The composition of matter of claim 1, wherein said guest molecule is a biologically active agent.

3. The composition of matter of claim 2, wherein the active agent comprises a therapeutic agent or an imaging agent.

4. The composition of matter of claim 3, wherein the therapeutic agent is selected from the group consisting of an immunogenic peptide or protein, a chemotherapeutic agent, a toxin, a radiotherapeutic agent, a radiosensitizing agent and combinations thereof.

5. The composition of matter of claim 3, wherein the imaging agent is selected from the group consisting of paramagnetic, radioactive and fluorogenic chemical species.

6. The composition of matter of claim 1, wherein the nanoparticle template is dissolved to thereby form a nanocapsule defined by the shell and wherein the guest material resides in the nanocapsule.

7. The composition of matter of claim 1, wherein the nanoparticle template comprises a material selected from the group consisting of a metal, a ceramic, an organic polymer, and combinations thereof.

8. The composition of matter of claim 7, wherein the metal is selected from the group consisting of chromium, rubidium, iron, zinc, selenium, nickel, gold, silver, copper, platinum, and combinations thereof.

9. The composition of matter of claim 7, wherein said ceramic comprises a material selected from the group consisting of silicon dioxide, aluminum oxide, ruthenium oxide, and tin oxide.

10. The composition of matter of claim 7, wherein said organic polymer comprises a material selected from the group consisting of polystyrene, poly(pyrrole), poly(N-methylpyrrole), poly(ethyleneglyccl), and combinations thereof.

11. The composition of matter of claim 1, wherein the nanoparticle template comprises a sphere, a rod, a wire, or combination thereof.

12. The composition of matter of claim 1, wherein the nanoparticle template is a sphere having a diameter ranging from about 1 nanometer to about 1,000 nanometers.

13. The composition of matter of claim 12, wherein the nanoparticle template is a sphere having a diameter ranging from about 5 nanometers to about 200 nanometers.

14. The composition of matter of claim 13, wherein the nanoparticle template is a sphere having a diameter ranging from about 10 nanometers to about 50 nanometers.

15. The composition of matter of claim 1, wherein the monomer comprises an organic monomer, a ceramic, or combinations thereof.

16. The composition of matter of claim 15, wherein said organic monomer comprises a material selected from the group consisting of styrene, pyrrole, N-methylpyrrole, ethyleneglycol, and combinations thereof.

17. The composition of matter of claim 16, wherein said ceramic comprises a material selected from the group consisting of silicon dioxide, aluminum oxide, ruthenium oxide, and tin oxide.

18. The composition of matter of claim 1, wherein the nanoparticle template is dissolved to thereby form a nanocapsule defined by the shell.

19. The composition of matter of claim 1, further comprising a plurality of nanoparticles, wherein the polymerization of the monomer is allowed to proceed for time sufficient to form a composition of matter strand comprising the plurality of nanoparticle templates.

20. The composition of matter of claim 1, wherein the shell has a thickness determined by a time of polymerization of the monomer.

21. The composition of matter of claim 1, further comprising an additional layer on the nanoparticle template, the additional layer formed by polymerizing an additional monomer on the nanoparticle template.

* * * * *